United States Patent
Matuchniak et al.

(10) Patent No.: US 11,443,263 B2
(45) Date of Patent: Sep. 13, 2022

(54) ORGANIZATIONAL RISK MANAGEMENT SUBSCRIPTION SERVICE

(71) Applicant: SOS SOFTWARE, INC., Yorba Linda, CA (US)

(72) Inventors: Tadeusz Peter Matuchniak, Irvine, CA (US); Joel Slutzky, Newport Beach, CA (US); Kevin C. Daly, Newport Beach, CA (US)

(73) Assignee: HEYHQ, INC., Yorba Linda, CA (US)

( * ) Notice: Subject to any disclaimer, the term of this patent is extended or adjusted under 35 U.S.C. 154(b) by 0 days.

(21) Appl. No.: 16/904,962

(22) Filed: Jun. 18, 2020

(65) Prior Publication Data

US 2020/0401963 A1 Dec. 24, 2020

Related U.S. Application Data

(60) Provisional application No. 62/863,212, filed on Jun. 18, 2019.

(51) Int. Cl.
*G06Q 30/00* (2012.01)
*G06Q 10/06* (2012.01)
(Continued)

(52) U.S. Cl.
CPC ......... *G06Q 10/0635* (2013.01); *H04L 51/04* (2013.01); *H04L 51/224* (2022.05); *H04L 63/20* (2013.01); *H04L 67/56* (2022.05)

(58) Field of Classification Search
CPC .... G06Q 10/0635; G06Q 10/00; G06Q 10/02; G06Q 10/06; G06Q 10/10; G06Q 30/02;
(Continued)

(56) References Cited

U.S. PATENT DOCUMENTS 6,519,571 B1 * 2/2003 Guheen .............. G06Q 30/0269
705/14.66
10,896,160 B2 * 1/2021 Denyer .............. G06Q 10/0635
(Continued)

OTHER PUBLICATIONS

Gander, Philippa, et al. "Fatigue risk management: Organizational factors at the regulatory and industry/company level." Accident Analysis & Prevention 43.2 (2011): 573-590. (Year: 2011).*

*Primary Examiner* — Joseph M Waesco
*Assistant Examiner* — Jay-Ming Wang
(74) *Attorney, Agent, or Firm* — Lazaris IP

(57) ABSTRACT

An organizational risk management service includes a risk assessment and mitigation platform for evaluating organizational risk. The service includes interfaces for managing connections with organizational and external systems for intake of messaging that provides information which is analyzed to define risks faced by an organization. This risk is defined by analyzing this messaging and its metadata with a system manager, a rules engine, and a message manager. The service and platform models responses to address the risks faced by the organization, and generates event relays that comprise communications, alerts, notifications, instructions, and other information for registered users, and external systems that enable actions for addressing and mitigating the risk and compliance with organizational policies and procedures.

21 Claims, 4 Drawing Sheets

(51) Int. Cl.
*H04L 9/40* (2022.01)
*H04L 51/04* (2022.01)
*H04L 51/224* (2022.01)
*H04L 67/56* (2022.01)

(58) Field of Classification Search
CPC ....... G06Q 10/06315; G06Q 10/06375; G06Q 10/06395; H04L 51/04; H04L 51/24; H04L 63/20; H04L 67/28; G05B 2219/31357
See application file for complete search history.

(56) References Cited

U.S. PATENT DOCUMENTS

| | | | |
|---|---|---|---|
| 2004/0107125 A1* | 6/2004 | Guheen | G06Q 99/00 705/319 |
| 2011/0054968 A1* | 3/2011 | Galaviz | G06Q 10/10 705/7.41 |
| 2016/0359915 A1* | 12/2016 | Gupta | H04L 43/04 |
| 2017/0126740 A1* | 5/2017 | Bejarano Ardila | H04L 63/1433 |
| 2018/0329744 A1* | 11/2018 | Shear | H04L 47/70 |
| 2019/0014153 A1* | 1/2019 | Lang | G06F 21/604 |
| 2019/0288915 A1* | 9/2019 | Denyer | G06Q 10/06315 |
| 2019/0319961 A1* | 10/2019 | Levy | H04L 63/1425 |
| 2019/0319971 A1* | 10/2019 | Levy | H04L 63/1441 |
| 2019/0319987 A1* | 10/2019 | Levy | H04L 63/083 |
| 2019/0387003 A1* | 12/2019 | Ford | H04L 63/102 |

* cited by examiner

ORGANIZATIONAL RISK MANAGEMENT SUBSCRIPTION SERVICE

CROSS-REFERENCE TO RELATED PATENT APPLICATION(S)

This patent application claims priority to U.S. provisional application 62/863,212, filed on Jun. 18, 2019, the contents of which are incorporated in their entirety herein. In accordance with 37 C.F.R. § 1.76, a claim of priority is included in an Application Data Sheet filed concurrently herewith.

FIELD OF THE INVENTION

The present invention relates to risk management systems. Specifically, the present invention relates to systems and methods for effective utilization of privileged information in organizational and personal risk management systems for modern organizations whose personnel are physically distributed and often mobile, in a manner that can be a trusted basis for coordinated action and which protects the privacy and security of the privileged information. Such privileged information may originate within the organization, among the personnel of the organization, or from trusted sources external to the organization.

BACKGROUND OF THE INVENTION

Modern organizations are often characterized in that both material and human assets are geographically distributed across many different locations, and must function in disparate operational and regulatory environments. Nonetheless, organizations still have a duty of care for those assets, resulting in obligations to the organization itself, its personnel and stakeholders, and regulators, among many others. Modern communication and information management techniques provide resources for meeting this duty of care; however, their effectiveness depends upon several critical elements.

Data security is one such element, and is essential at least in part because data being managed is related to the operational status and vulnerabilities of all the organization's assets. Data may therefore be critical proprietary information to the organization, resulting in the need for security measures to protect it.

In the case of an organization's human assets, there are additional needs for maintaining and protecting privacy. This may differ from location to location within the same organization; for example, California's California Consumer Privacy Act (CCPA) provides extensive data privacy provisions that include protection of Personally Identifiable Information (PII) of human assets, among other things, which is also required by the European Union's General Data Protection Regulation. Accordingly, privacy is another critical element for maintaining and meeting an organization's duty of care.

Modern organizations also have a duty of care to protect at least their human assets from threats and provide a safe working environment. Addressing threatening situations requires that organizational users and systems be integrated so that such protection can be realized as quickly as possible, and that compliance with policies and procedures can be adhered to.

Evidentiary requirements are another important element in terms of duty of care obligations, as an organization must often prove that it has provided its duty of care if challenged by regulators, its risk mitigation partners, or any of its personnel who consider they have been damaged by the organization's failure to do so. Therefore, communications and information management systems must account for and enable forensic utility of the organization's data.

Duty of care issues illustrate an essential duality faced by modern organizations: they must collect and analyze a large amount of information extensively, but that information may, itself, represent a liability if it is not managed appropriately. Many of these issues can be significantly mitigated if the duty of care is limited to the organization's material assets, but it is increasingly the case that the value of an organization's assets resides more so in its human assets rather than its material assets. Therefore, limiting the duty of care to material assets is of limited, and decreasing, value to an organization. Even in this case, however, supporting the operational effectiveness, not just the mere existence, of asset protection systems, is critical if the organization's ability to support meeting its duty of care is called into question.

Modern organizations are also faced with challenges stemming from a need to make informed decisions in the shortest time possible. In order to make such informed decisions, organizations must get feedback or input from multiple members of their organizations, Many of these members are available and reachable through mobile connections on mobile devices, due to an increasingly mobile world and remote working environments where human assets are increased spread across more and more locations. Organizations are faced with challenges in establishing priority connections to members in a such a mobile environment to deliver and receive important information quickly, elevating priority for responses and for requests and, furthermore, structuring these communications so the organization can make rapid and informed decisions. Organizations are able to connect increasingly distributed groups of people; however, ubiquitous mobile connectivity has not yet provided these organizations with capabilities to connect to their mobile users utilizing structured and prioritized messaging in a way that satisfies these challenges and enables meeting the duty of care issues illustrated above.

Thus, there is a need in the art for improvements to gathering, maintaining, managing, and processing information within organizations to meet its substantial duty of care obligations in an increasingly distributed business world. There is a further need for improvements in helping organizations assess and mitigate risks in such an operating environment. There is also a need in the art for improvements in the manner in which communications between businesses and their customers can be integrated into an approach for maintaining and meeting an organization's duty of care for both material and human assets.

SUMMARY OF THE INVENTION

The present invention is a framework for risk assessment and mitigation that combines the Internet of Things (IoT) with an Internet of Persons™ (IoP) approach to deliver, in one aspect of the present invention, a risk management service that incorporates elements of both organizational and personal risk management. Such a risk management service enables organizations to manage their risks in response to unexpected events, such as environmental or weather issues, civil disruptions, loss of infrastructure, and public health and safety events such as pandemics, through the exchange of trusted messages and analysis of information contained in such messages. These messages provide the basis for a coordinated organizational response to these events, protect the privacy and security of the information used for this response, and preserve a secure record of all the data and metadata associated with all messages for subsequent operational or forensic analysis.

The framework for risk assessment and mitigation is provided in one or more systems and methods that provide a private, secure, and auditable means of coordination between an organization and individual ones or groups of its mobile users, through the risk management service. The service internal, cloud-based components with a private mobile messaging system (PMMS), a set of application programming interfaces (APIs) for exchanging privileged information between the organization and both its and individual users and external data sources in a private and secure manner, a secure portal for the organization's system managers to manage external trusted data sources and define the rules required to implement the organization's risk management procedures, and outbound APIs for communicating information within the service to its users and to external systems that are needed to implement specific actions associated with risk management. This last instance of APIs act as event relays for communicating information in response to events that represent a defined risk, where the receiver is on the same Internet Protocol network, and where the receiver is also able to accept information via its own web services-based APIs, such as for external systems.

The present invention includes several components that interact in a private, secure and authenticated manner, and which perform the systems and methods described further herein. These may include a system client, which may act as a gateway for a dedicated application for a PMMS that is installed on personal mobile devices of the organization's personnel and registered with the organization. The system also includes extensions, which are software that permits integration of the service with trusted external data sources, both in terms of receiving external inbound alerts from external sources based on configurable rules defined by the organization. These external inbound alerts may be escalated into an "InSite Event", as well as external outbound commands or alerts to external systems, which may or may not be the same external systems. A cloud-implemented server environment hosts a system manager which provides administration, operations, and analysis by the organization, a database, a rules engine, and a message manager for all message traffic.

The present invention is designed to work over Internet-connected and mobile carrier networks. By establishing priority connectivity through Internet, push technology services and wireless carrier networks to mobile users of the organization, the invention improves organizational decision making, workforce security and safety, and raises the standard of mobile connectivity and information distribution. The invention is designed to deliver low-bandwidth structured messaging over a dedicated and prioritized network while minimizing use of mobile device resources such as battery power, computing, memory, and bandwidth.

Accordingly, the present is comprised, in one embodiment thereof, of a system client configured to manage interaction with a system user and including at least one system client database and a system client user interface controlled by an application server, a mobile client configured to manage interaction with personnel of the organization who are mobile users of the system and have one or more mobile devices registered to them, and a secure messaging server configured to manage interaction between the system client and the mobile client and with one or more external systems providing supportive services to either of the system client or the mobile client, the secure messaging server including an application server component and a database server component each performing messaging functions in the interaction between the system client and the mobile client and with one or more external system. Through the exchange of trusted messages, the organizational risk management system can coordinate the response of the organization and its mobile users in response to unexpected events, ensure the privacy of all the data utilized in the coordination of the organization's response for the protection of the organization, its personnel, and, as necessary, external sources contributing data to the system, and create a permanent database record of all responses of the organization and its constituent users and external systems.

It is one objective of the present invention to provide a system and method of implementing a risk management service for organizations. It is also an objective of the present invention to provide a system and method of improving operational efficiency for organizations with distributed and mobile stakeholders, as well as enhanced support, security, and safety for all mobile stakeholders of the organization, within such a risk management service. It is another objective of the present invention to provide a system and method of protecting and containing all privileged information within such a risk management service. It is still another objective of the present invention to provide a system and method for timely communication of trusted messages to all personnel in the organization that form the basis for coordinated actions on the part of the personnel within such a risk management service. It is a further objective of the present invention to provide a system and method implementing actions on the part of distributed personnel of the organization that reduce the risk to the personnel, individually or collectively, and to the organization itself, within such a risk management service.

It is also an objective of the present invention to provide a system and method for analyzing and implementing an organizational response to unexpected events. It still a further objective of the present invention to provide a system and method of training personnel for effective organizational response to unexpected events. It is yet another objective of the present invention to provide a system and method of demonstrating that an organization has met its duty of care to its personnel and others to whom such a duty is owed.

Other objects, embodiments, features, and advantages of the present invention will become apparent from the following description of the embodiments, taken together with any accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENT(S) OF THE INVENTION

Figure 1:
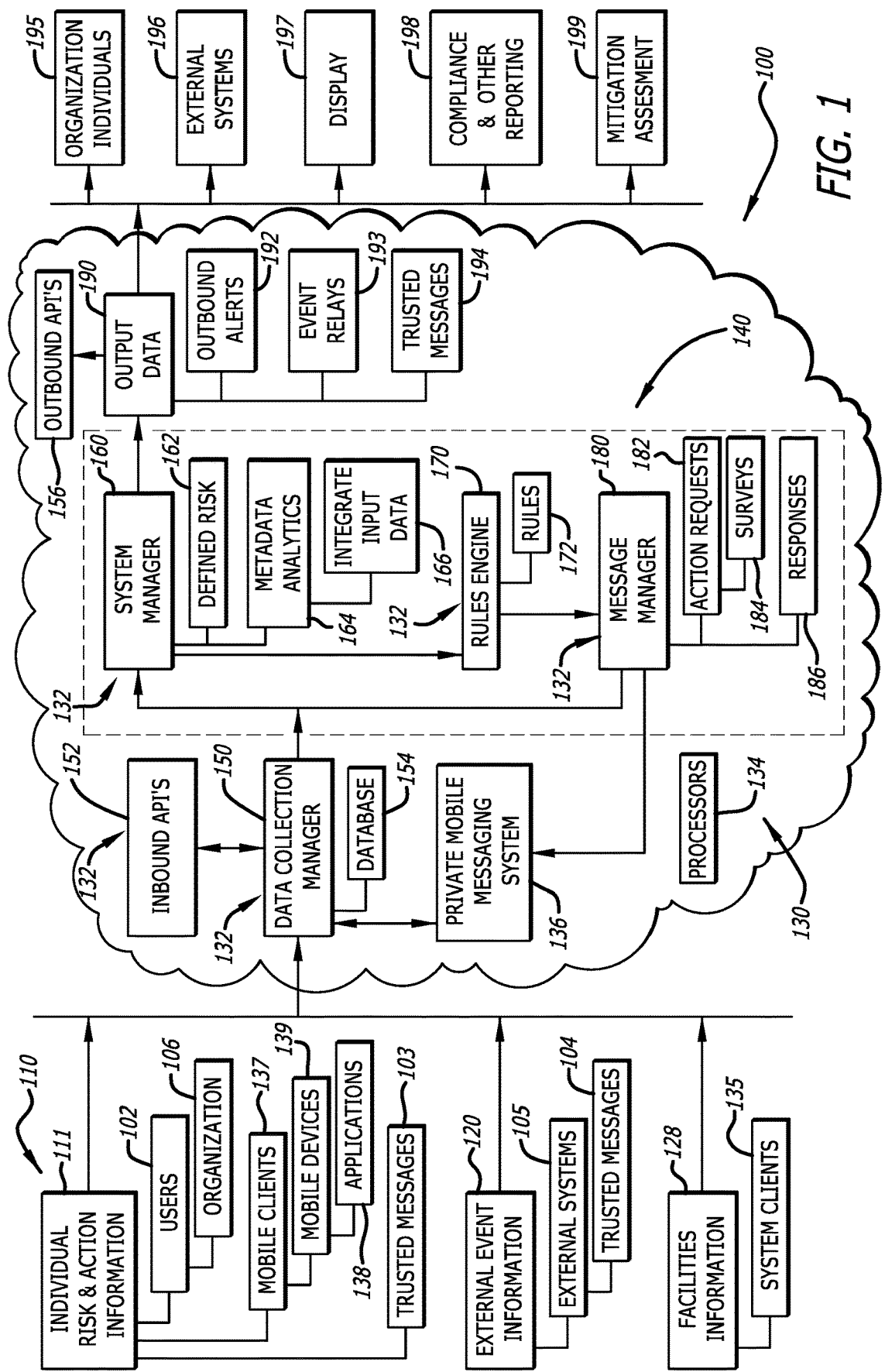
FIG. 1 is a diagram illustrating components in a computing environment and risk assessment and mitigation platform that operates within a risk management service according to one embodiment of the present invention.

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The risk assessment and mitigation platform 140 of the risk management service 100 of the present invention may be referred to herein generally as InSite or the InSite system. InSite is tool that enables organizations 106 to manage the risks, and includes, as noted above, a plurality of hardware and software components that together enable the intake of input data 110, the processing of information in that input data 110, and the generation of responsive or instructional output data 190. InSite includes one or more servers that manage information flow within the platform 140, and may utilize as noted above a private mobile messaging system 136 that is configured for handling trusted messaging. InSite may initiate surveys 184 in response to message or events, and therefore trusted mobile messages 103 and trusted external messages 104 may be either origination messages, or responsive messages, and may further also be trusted outgoing messages 194. One or more messaging servers may be included to manage the movement of messages within the platform 140.

The risk assessment and mitigation platform 140 establishes a connection between the organization 106 and its member users 102, incorporating extensions to external systems 105 and 196 that connect external data sources that are relevant to a given organization (see diagram for examples of extensions), in order to distribute important messages. The connection between the organization 106 and its users 102 is secure and authenticated, and all communications are made between end points that axe dedicated to that communication between the organization 106 and users 102. All messages sent and received by the organization 106 are logged and auditable, as are all messages received and sent by users 102 are also logged and auditable, for example on the user's mobile device 139.

InSite is therefore a system and method of exchanging secured, critical structured messages between an organization 106 and its mobile-enable users 102. Features of the present invention enable prioritizing important information, empowering and demanding mobile user response, establishing real-time status, enhancing effectiveness and timeliness of event response, and enabling priority communications more effectively, directly, and around the clock to all selected personnel regardless of their location. The present invention provides for structured messaging applications for organizations 106 and their mobile users 102, which are delivered to organizations 106 as a service that is designed to be deployed by businesses, schools, clubs, unions, fan bases, law enforcement, government, and any other organization, while at the same being extendable to smaller groups such as families, communities and neighborhoods.

The present invention is, according to exemplary embodiment thereof, a risk management service 100 that is provided within a risk assessment and mitigation platform 140, and is embodied in one or more systems and methods for enabling coordination between organizations 106 and their distributed and/or mobile stakeholders as well as systems external thereto. The one or more systems and methods are performed in a plurality of data processing modules 132 that are components within a computing environment 130 that includes one or more processors 134 and a plurality of software and hardware components. The one or more processors 134 and plurality of software and hardware components are configured to execute program instructions or routines that are stored on or accessed from a storage medium, non-transitory or otherwise, to perform the modules, components, and data processing functions described herein, and embodied within the one or more data processing modules 132 configured to carry out such data processing functions.

FIG. 1 is a system diagram for such a risk management service 100 of the present invention. The risk management service 100 includes, as noted above, a risk assessment and mitigation platform 140 for processing input data 110 that at least includes individual risk and action information 111 from registered organizational users 102 and external event information 120 from external systems 105, and generates output data 190 in the form of outbound alerts 192, event relays 193, and trusted messages 194 which are communicated to mobile applications 138 on mobile devices 139 associated with the registered organizational users 102 and external systems 105 as described further below.

The risk assessment and mitigation platform 140 is executed within several elements that interact in a private, secure and auditable manner to execute a plurality of algorithms configured to process the input data 110 to define a risk 162 faced by the organization 106 and orchestrate one or more responses 186 to address this defined risk 162. These elements may comprise one or more of the data processing modules 132, and may include a system client 135 which is a dedicated application for a private mobile messaging system 136 (PMMS) that may be installed on personal mobile devices 139 of the organization's users 102, and registered with the organization 106. The PMMS 136 may itself be considered a data processing module 132; regardless, the system client 135 and, where applied, the PMMS 136, are configured to ensure that trusted messages 103 that at least include individual risk and action information 111 are conveyed from one or more mobile clients 137, using one or more mobile applications 138, to the risk assessment and mitigation platform 140.

The data processing modules 132 may also include a data collection module 150, which manages one or more inbound application programming interfaces (APIs) 152, which enable extensions that permit integration of the risk management service 100 with trusted data sources in the one or more external systems 105 based on configurable rules defined by the organization 106. External systems 105 may be any system that is external to the risk assessment and mitigation platform 140, and which are connected thereto via extensions that are enabled the one or more inbound APIs 152, and by one or more outbound APIs 156 for outbound commands or alerts to external systems.

The data processing modules 132 also include a system manager 160, which is configured to provide functions of administration and operation, as well as analysis of the input data 110 by the organization to identify information that defines the risk 162 faced by the organization 106. The data processing modules 132 may further include a rules engine 170 which further develops one or more responses 186 to this defined risk 162, and a message manager 180, which coordinates message traffic within the risk assessment and mitigation platform 140.

Individual risk and action information 111 may be communicated via trusted mobile messages 103 from one or more mobile applications 138, which are associated with mobile devices 139 and users 102. Users 102 may manipulate the mobile applications 138 stored or accessed from their mobile devices 139 to convey information as to a number of different events or activities. Additionally, the mobile devices 139 may automatically generate and transmit the individual risk and action information 111 when a particular action is detected, for example using sensors or other devices that are connected or coupled to the mobile applications 138, so that no user manipulation is necessary. Regardless, individual risk and action information 111 may include a report or eyewitness account, a request for support or assistance, a monitor or panic signal, a survey broadcast, or a door access request. It is to be noted that many other examples of such individual risk and action information 111 are also possible, and that any type of notification generated by a user 102, a mobile application 138, or a mobile device 139 are possible and within the scope of the present invention. Accordingly, the present invention is not to be limited to any one type of individual risk or action information 111 referenced herein.

External event information 120 is, as noted above, information that is generated and transmitted in trusted external messages 104 from external systems 105 to a data ingest module 150, a system manager 160, or any other module, component, or processor within the risk assessment and mitigation platform 140. External event information 120 may include facilities management information, weather or disaster event information (such as for example severe rainstorms or snowstorms, tornadoes, hurricanes or earthquakes), news information such as a news bulletin, intrusion detection notification, a card access failed notification, a camera movement detection notification, a facial recognition notification, or other event requiring immediate notification and attention that is reported by an external system 105, such as for example a gunshot or gunfire, an armed attacker active shooter present, or other instance of chaos or mayhem occurring.

The input data 110 may further include facilities information 128 which describes one or more organizational facilities. Such organizational facilities may be impacted by any event that also impacts the organizational users 102 and the organization itself 106, and therefore the risk management service 100 may incorporate such facilities information 128 to both define a risk 162 and model a most appropriate or necessary response to an event reflected in mobile messages 103 or external messages 104. The risk management service 100 may further include, and/or access, a secure, cloud-based, organizational database 154, configured to store input data 110, including any metadata 164 that is extracted and developed, and any other information that is relevant to an organization 106.

It should be understood that the input data 110 need not be provided when an event occurs that triggers the generation of individual risk and action information 111 or external event information 120. The present invention may include one or more background processes that ingest data from external sources on a periodic or continual basis, such as for example earthquake data from United States Geological Service. Therefore, the ingest of input data 110 may not be on behalf of, or at the behest of, any particular organization. The present invention may therefore include one or more levels of structure that are higher than any particular organization 106 that implements the risk management service 100.

Where such input data 110 is obtained a higher structural level than any organization 106, the present invention invokes configurable rules 172 to notify an organization 106 that is subscribed to that data source, and those rules 172 determine how any given organization wishes to handle the information therein. For example, one organization may want to generate an eyewitness report when the earthquake is within 1 mile and magnitude 4.0, whereas another organization may have set a lower threshold for distance and higher for magnitude.

The risk assessment and mitigation platform 140 incorporates and performs multiple algorithms that together perform the functions of aggregating and integrating input data 110, analyzing the information in that input data 110 to define a specific risk 162 faced by the organization 106, determining what should happen to address the defined risk 162, and communicating event relays 193 representative of responses 186 thereto. The various elements of the risk assessment and mitigation platform 140 may each perform one or more of these algorithms, which are applications of mathematical processes on the various input data 110 and metadata 164 as described further below.

The system manager 160 performs one or more algorithms that together operate to identify, develop, correlate and integrate all risk information in the input data 110 that is relevant to individuals and/or facilities of the organization 106 from both the individual risk and action information 111 and the external event information 120, and define the specific risk 162 faced by the organization 106. This is accomplished by analyzing an overlap in metadata 164 that is relative to events reflected in the action individual risk and information 111, external events reflected in the event information 120, and any other internal or external events identified by the risk assessment and mitigation platform 140. Metadata 164 may be based on a plurality of factors; for example, metadata may represent a configurable proximity of events for one or more characteristics that include general location, specific positioning, date, time, user role, department, active work status, etc. The system manager 160 uses this information to identify and define a specific risk 162 to the organization 106 from the overlap in metadata 164.

In one example, the risk assessment and mitigation platform 140 may include an algorithm. where the PMMS 136 identifies and surveys all users 102 for whom a last reported geolocation of their mobile devices 139 is within a defined geographic region that is associated with an event (e.g. flood, earthquake) to determine their status and, if necessary, respond to their needs.

In another example, an algorithm may be applied to associate all messages that are related to an initiating event or message. In this case, the database 154 may be queried for all messages that contain a reference to the GUID (Globally Unique Identifier) in their metadata 164. This subset of messages may be further refined by reference to the time of the messages and the geolocation of the mobile device 139, both being items that may also be derived from metadata 164. Using this algorithm, an appropriate set of users 102, and their status (using both message data and metadata 164) may be identified and provided to the system manager 160 for subsequent follow-up action.

In yet another example, an algorithm may be applied to identify all users 102 who are organizationally associated with an individual (derived from information in the organizational database 154) who represents an established health risk. These users 102 may then be directed to implement an appropriate protocol to establish their status.

In still a further example, an algorithm may be applied to determine the status and geolocation of one or more users 102 that request monitoring or support by the organization 106. This may be discerned from the message data and metadata 164 in survey messages broadcasted to their mobile devices 139 and updating the status and geolocation automatically and in real time based on the information returned.

In still another example, the risk assessment and mitigation platform may identify patterns of behavior that occurred as a collection of prior, and seemingly unrelated, events that resulted in another more critical event, these patterns may be used to drive an algorithm configured to search for possible future critical events. In an illustrative example of this, assume that last week there were five events that occurred within a mile radius around a known site within the organization within 5 minutes, each of which appeared to be unrelated—such as two separate strangers lurking around the site, an unscheduled fire drill, a broken door, and graffiti—that resulted in an armed robbery which was later determined to have connected the five events. This pattern of events may be actively searched for using one or more algorithms, with an alert being raised if they occur.

The rules engine 170 performs one or more algorithms that together operate to identify and aggregate all information regarding the specific risk 162 to the organization 106. This information may include a resulting status of all of the affected organizational individuals, and their compliance with organizational policies and procedures. The rules engine 170 applies one or more rules 172 to organize this information for further use by the system manager 160 according to one or more rules, and to develop action requests 182 (such as for example in surveys 184) and responses 186, and evaluate those responses 186 for further action needed. For example, the rules engine 170 may apply the rules 172 to aggregate responses 186 to a survey 184 that is broadcasted to either all users, a user-defined subset, or a specific mobile user, to determine what automated system or procedural flow should occur to further address the defined risk 162.

The message manager 180 is configured at least in part to push the action requests 182 from the rules engine 170 to the organization's users 102 through their mobile clients 137, and process responses 186 from mobile clients 137 confirming the receipt of the action requests 182 and the compliance of the organization's users 102. Action requests 182 may therefore themselves be considered a form of output data 190, as they may form the content of trusted output messages 194 to the registered organizational users 102 and external systems 105 as a result of the processing steps performed in risk assessment and mitigation platform 140 and risk management service 100.

Figure 2:
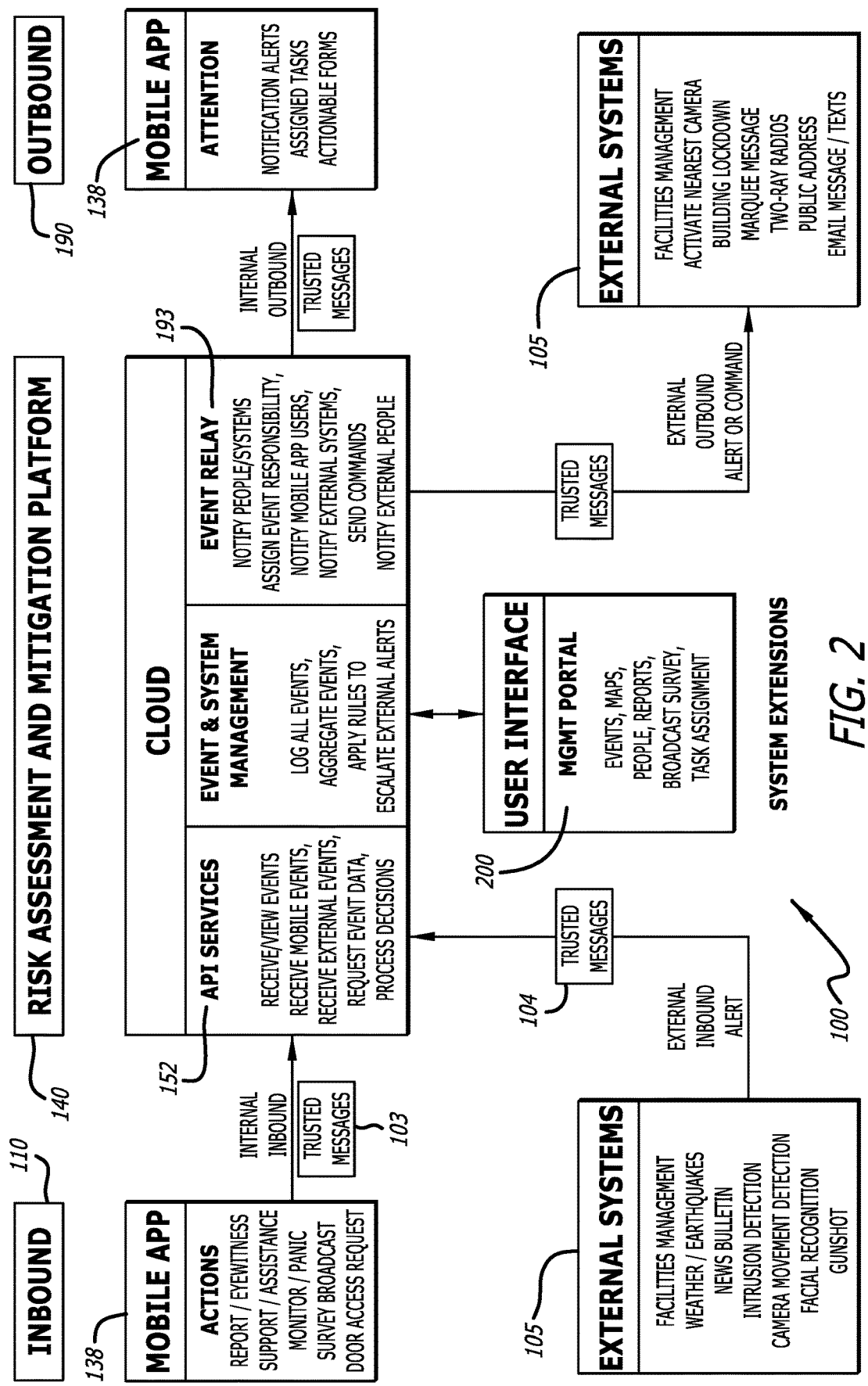
FIG. 2 is a further diagram of a risk assessment and mitigation platform of a risk management service according to the embodiment of FIG. 1.
Figure 3:
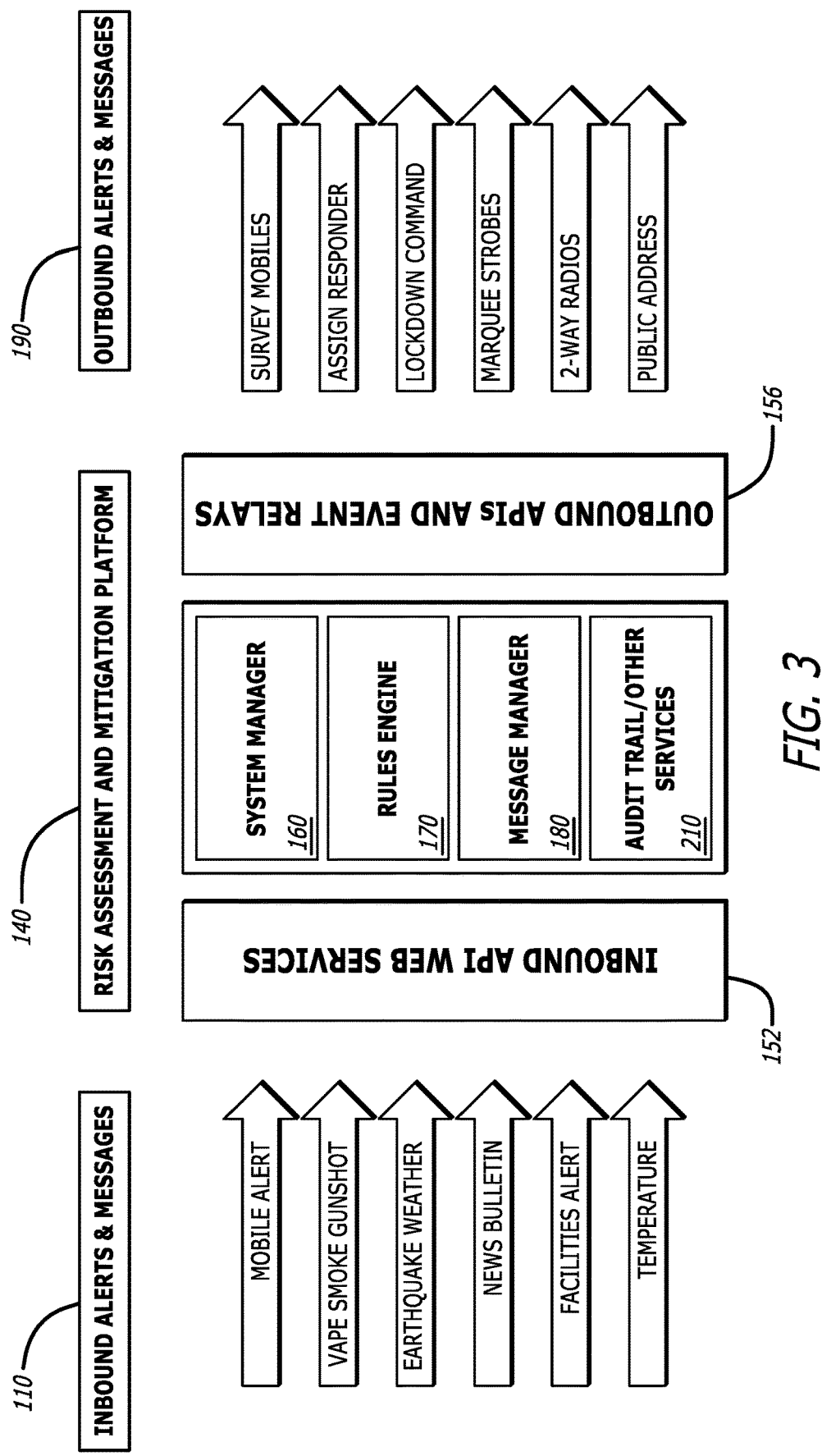
FIG. 3 is still another diagram of a risk assessment and mitigation platform of a risk management service according to the embodiment of FIG. 1.

As noted in FIG. 2 and FIG. 3, other data processing modules 132 are also possible and within the scope of the present invention. For example, the risk assessment platform 140 may include an audit manager 210 for maintaining an audit trail and performing other compliance and mitigation functions. Such an audit manager 210 may be configured to track action requests 182 and responses 186 thereto, as well as the timing at least of such responses 186, for example where event relays 193 are used to broadcast surveys 184 to affected organizational individuals.

Output data 190 may include, as noted above, outbound alerts 192, event relays 193, and messages 194, and may be communicated to a several different people, places, or systems, and for many different reasons. For example, an event relay 193 may be initiated to convey messages 194 to organizational individuals 195, or to external systems 196. Output data 190 may be configured to a display 197, for example on the user interface 200. Output data 190 may also comprise compliance and other reporting information 198, and a mitigation assessment 199 as discussed further herein.

Trusted mobile messages 103 and trusted external messages 104 include specific metadata 164, in information that is not directly supplied by the mobile users 102, the external systems 105, or the system manager 160. This metadata 164 may nevertheless be provided by one or more servers that connect the system clients 135 with the system manager 160, a mobile telecommunications network, mobile devices 139, other devices accessing the risk assessment and mitigation platform 140, or some combination of these elements.

Metadata 164 may include many different pieces of information. This may include a Globally-Unique Identifier (GUID) for each trusted mobile message 103 or trusted external message 104, and may identify the originating source of each message, for example the organizational user 102 or the system client 135. Metadata 164 may also identify the type of message, the time the message was originated, the date the message was originated, and where the message is responsive to a survey 184 initiated by the risk assessment and mitigation platform 140, an associated message identifier that correlates the message with the particular survey 184.

Metadata 164 may also include device-specific information that is relative to each mobile message 103 or external message 104, where this information is available and/or as reported by the device itself. For example, metadata 164 may identify the location of the device communicating with the risk assessment and mitigation platform 140 or messaging manager 180, a status of the device, and any other information provided by communicating devices to aid subsequent analysis of the metadata 164.

All metadata 164 that is associated with each mobile message 103 or external message 104 (either originating or survey-responsive), as well as the message data that comprises the content provided by the organizational user 102, or system manager 160, or message manager 180, is stored in the secure, cloud-based organizational database 154 of the risk assessment and mitigation platform 140. Using this metadata 164, the risk assessment and mitigation platform 140 may perform several analyses, through properly structured database queries and one or more mathematical models or functions that process information in the mobile messages 103 and external messages 104, to generate output data 190.

These analyses of metadata 164 may include assessing a status of the mobile device 139 or organizational user 102 who issued the mobile message 103, such as determining a response time, a reported status, and a last reported location, for example for all users 102 who are expected to respond to a specific survey 184. Response times may be assessed according to an anticipated or expected response time of the user 102 that may be calculated based on many different factors, for example based on the user's prior history of responding and prior response times, proximity to an event (for example, the user 102 should respond within x minutes following a y event), or any other characteristic influencing a user's ability to respond, or defined by a particular set of rules. A reported status may generate a particular assessment of the user's state and a need for follow-up with that user 102, for example where the user messages a particular phrase or phrases that are flagged as troublesome. Similarly, a user's last reported location may be generate a particular assessment of the user's state and need for follow-up, for example where a fire has been reported and user's last reported location was near the location of the fire, or for example where a user 102 who is required by rules established by a government agency responding to a health emergency to maintain a particular distance from other users, the analyses determine that distancing rules are not being adhered to.

Analyses of metadata 164 in the risk assessment and mitigation platform 140 may also include determining the location and status of any users 102 who have requested support. The present invention therefore may calculate a user's geo-location based on information in the metadata 164, as well as their movement characteristics. The present invention may also assess the user's status, reported or otherwise, following support requests from such location information, for example if the user 102 has moved a significant distance or to a particular place. In such an example, a user 102 who has requested support following a report of an armed intruder may not report a status, but their location can be analyzed to determine where assets may be deployed to help the user 102.

Analyses of metadata 164 in the risk assessment and mitigation platform 140 may also include a time of receipt and the acknowledgement, if any, of a responsive message directing specific action on the part of a user 102. Timings of receipts and acknowledgements may be calculated and compared with expected receipt timings and acknowledgements, and assessments can be made where the present invention may infer that certain additional events have occurred.

The risk assessment and mitigation platform 140 may fuse or aggregate information in mobile messages 103 from users 102, and/or in external messages 104 from external systems 105, to enhance the credibility of reported events. Analysis of metadata 164 may therefore include analyzing information in such messages 103 and 104 to determine what information to fuse, and how to fuse, in response for example to the particular reported event. An analysis of metadata 164 may include initiating a response by the system manager 164 to any message received from a registered user 102 and, if necessary, a dialogue with the user 102. Analysis in such a context may therefore include making an assessment that a response 186 is necessary based on the metadata 164, and further than a dialogue must be initiated, for example to obtain further information, determine a user status, etc. Fusion of information in the mobile messages 103 and/or in external messages 104 may further assist such as assessment, for example where several users 102 have reported the same event and one user has become isolated from other users 102.

Analysis of metadata 164 in the present invention may further include an identification of all user locations within a defined geographic area of interest. For example, where an external message 104 is received reporting a sudden weather event such as a tornado (or where a tornado is expected to strike, or along its expected trajectory), the risk assessment and mitigation platform 140 may analyze metadata 164 to identify all registered users 102 that are located within a certain radius of the tornado, where it is expected to strike, or within its path. Such an analysis may also be used for contact tracing, for example in a public health emergency, to identify all users 102 who have had contact with a person reporting an infection or identify all users 102 within a certain distance of a user 102 who reports a status of (or who is reported as having) experiencing symptoms of an infection. Similarly, the present invention may determine a dissemination of a survey 186 to a specific set of users 102 from the system manager based on the metadata 164.

Metadata 164 may also be used to determine an assignment of requests from users 102 for actions to responsible individuals within the organization, and follow-up with those responsible individuals until those actions are completed. Metadata 164 may be analyzed to assess whether those actions have been completed, for example based on other messages or signals from the mobile devices 139 associated with them, and survey responsible individuals until the actions have been completed.

Metadata 164 may also be analyzed to determine the status, the last reported location, and the availability of all registered users 102. For example, metadata from the last messages sent by mobile devices 139 of an organization's users 102 may be examined to immediately assess where all its users 102 are and whether they are available to respond to a particular event.

Metadata 164 may also be assessed to identify all users 102 to whom specific information from trusted external sources may be relevant. Metadata 164 may also provide information that enables implementation, through an event relay algorithm as an outcome of the application of rules 172 from the rules engine 170, of specific actions by external systems 105 in response to information received from users 102 and/or trusted external information sources.

The present invention may also model metadata 164 to assess a response to a specific event to evaluate compliance with organizational policies, organizational duty of care, and/or compliance with regulatory or governmental directives. For example, if the users 102 are required to wash their hands every 20 minutes, and maintain a specified distance from all other individuals in the organization 106, the metadata 164 may indicate whether each user 102 has visited a washing station within 20 minutes of their last visit, and whether they have come closer than the specified distance to any other user 102. If not, a compliance message may be generated as output data 190 to an external system 196 via an event relay 193.

Metadata 164 may also be used in training scenarios, for example to train individuals on organization response procedures for unexpected events, and subsequently assess actual responses and compare those to expected actions. Data from training and assessments of individuals may be used to improve organizational policy or generate reporting, such as where the organization 106 is required to certify that is has achieved certain training scores or levels of compliance.

The plurality of algorithms employed by the risk assessment and mitigation platform 140 of the risk management service 100 may access input data 110 and metadata 164 from the organizational database 154, which may comprise a very large number of database records. The present invention contemplates a structure for this database 154 that enables an efficient response to queries for the information stored therein. Additionally, the algorithms may employ may different techniques for evaluating such large amounts of information and modeling or simulating outcomes therefrom.

The plurality of algorithms may also be configured to request and retrieve information from the database 154 on a frequent or continual basis where needed to account for information that is highly dynamic, such as geolocation of mobile devices 139, to provide relevant and current results. Algorithms must therefore be flexible as to when and how often to retrieve information to perform the various data processing functions described herein. Additionally, algorithms must be flexible to accommodate changes in the one or more rules 172 applied by the rules engine 170 and system manager 160, as such rules 172 be arbitrarily defined and/or modified. For example, the definition of a geographic "area of interest" may change frequently, and the algorithms must include structures to accommodate these definitions and changes.

Algorithms must also be configured for consistency. The information used by the algorithms may be internally inconsistent. For example, there may be conflicting inputs from different users 102. The algorithms applied by the risk assessment and mitigation platform 140 may therefore utilize an approach such as hierarchical weighting for resolving inconsistencies at least as to the input data 110. Still further, the plurality of algorithms may be configured to determine trends over long periods of time relative to a specific event or response, and may apply weights or biases to certain types of input data 110 or metadata 164 for modeling such trends.

As noted above, the risk assessment and mitigation platform both receives messages 104 from external systems 105 containing input data 110, and sends event relays 193 to external systems 196 as output data 190. There are many examples of external systems 105 and 196 in the present invention; in one such example, such a system performs access control, such as for building security, badge or keycard authorization, managing door locks and cameras, etc. The messaging and event relay aspects are extensions of the risk assessment and mitigation platform 140 to such external systems 105 and 196, such that the present invention has the capability of extending to many different types of external system 105 and. Any type of external system 105 and 106 is contemplated as an extension of the present invention, regardless of whether it is a proprietary system or that of a third party or parties, and regardless of whether it incoming or outbound, or both.

Where the present invention extends to an external system 105 and 196 such as one performing access control, it should be understood that many aspects of integration of such systems must be considered in order to effectively extend the present invention to achieve the desired functionality. It should be further understood that many implementations of such exemplary access control are possible.

For example, when an event occurs within an organization 106 implementing the risk management service 100, the risk assessment and mitigation platform 140 may push that to an external system 105 or 196 via an event relay 193, e.g. to notify of the event. That access control system can display the alert, or turn on a camera, or lock down a door, etc., based on how the event relay is configured (such as whether it is an instruction to initiate a textual or oral alert, or an instruction to a device such as a camera or door to perform a specific action.) Conversely, when an event occurs within an external system 105 itself that is coupled to the risk management service 100 for an organization, then that external system 105 calls an inbound API 152 to notify the risk assessment and mitigation platform 140 of an external event. For example, where the risk management service 100 receives a "door forced open" alert, the present invention may initiate different types of responsive event relays 193. In such an example, respective tenant stakeholders may be notified, a task may be assigned to some registered organizational user 102, or a command may be forwarded to a public address system.

Event relays 193 in the present invention are configured by a system user, for example via the user interface and management portal 200 and support tool configured therewith, based on their organizational needs. It is to be understood therefore that an organizational system user may define a type of event that, when it occurs, is to be analyzed and used to define an organizational risk 162, and further whether a response in some form is to be generated and relayed, as well as what type of event relay 193 should be transmitted.

For example, types of events triggering an event relay 193 may be both user-centric and external (for example, a weather event or the access control issue described above). User-centric events may include a message 103 that the user 102 is in danger or in panic, the user 102 is in need of support, the user 102 wants to report something they saw, the user 102 checked in to work, or the user 102 wants to or has accessed a building.

Types of responsive event relays 193 may include sending a push notification to organizational individuals 195, assigning a task to specific organizational individuals 195, sending an email or text (both intra-organizational and extra-organizational), sending a command to an external system 196, and sending a notification to an external system 196. It is to be understood that many types of events and responsive event relays 193 are possible and within the scope of the present invention, and therefore the present invention is not to be limited to any one type of event or type of event relay 193 described herein.

FIG. 2 and FIG. 3 are further diagrams illustrating the various aspects of the risk management service 100. In FIG. 2 and FIG. 3, inbound information that is internal to the organization 106 is provided within mobile messages 103, and inbound information that is external to the organization 106 is provided within external messages 104. Mobile messages 103 are generated using mobile applications 138 configured with mobile devices 139 and associated with registered organizational users 102. Individual risk and action information 111 in messages 102 may be either manually initiated or automatically initiated, and represents information such as mobile alerts, reports and eyewitness accounts of events, requests for support or assistance, monitor or panic signals, survey broadcasts (and responses thereto) and facilities access requests on behalf of the registered organizational users 102. Other information includes reports or alerts by organizational users 102 of trespassers or intruders, smoke from tobacco or vaping products, or compliance/lack of compliance with particular procedures. Other types of individual risk and action information 111 may also be provided in the mobile messages 103, and therefore the present invention is not to be limited to any one type of information, or content of a message 102, described herein.

In one embodiment, inbound information may be related to public health issues, for example where state or federal authorities have implemented directions or guidelines aimed at protecting public health in a public health emergency, and/or imposed a duty of care on organizations to comply with such directions or guidelines. A mobile alert, report or notification may be provided in such an example by registered organizational users 102 that reflects a user's temperature, and compliance with procedures for having a temperature taken, as well as for other on-the-spot testing and compliance with testing protocols. Users 102 may also report compliance or lack of compliance with directions or guidelines to ensure that proper policies and procedures are followed, for example for risk mitigation and improving adherence to such directions and guidelines.

External messages 104 are generated by external systems 105 as noted above. These may include facilities management information, or alerts or notifications about weather events, news bulletins that contain information relevant to the organization 106, its location, or its facilities, detected instructions, failed access requests, motion detection, facial recognition failure, or other active emergency such as reported gunfire, an unauthorized weapon present, or an active shooter. As with individual risk and action information 111, other types of external event information 120 may also be provided in the external messages 104, and therefore the present invention is not to be limited to any one type of information, or content of a message, described herein.

Messaging in the risk management service 100 may be controlled by the message manager 180, together with one or both of the private mobile messaging system 136, or the inbound application programming interfaces (APIs) 152. The private mobile messaging system 136 may itself be controlled by the message manager 180. In one embodiment of the present invention, messaging within the organization itself is handled by the message manager 180 via the private mobile messaging system 136, while messaging outside of the organization is handled via the APIs 152. The inbound APIs 152 may be utilized for ingesting both mobile messages 103 and external messages 104. Regardless, these messages 103 and 104 carry the input data 110 which is used in the risk assessment and mitigation platform 140 to perform the various functions described herein.

The risk assessment and mitigation platform 140 manages these inbound APIs 152 in a cloud-based environment. API services, event and system management, and event relay services are all performed within such a cloud-based environment. In addition to enabling inbound mobile messages 103 and external messages 104, these APIs 152 may also communicate with mobile clients 137 and external systems 105 to request event data, and may also be configured to perform initial processing that makes preliminary decisions based on the mobile messages 103 and external messages 104.

Event and system management may include functions such as logging all events that occur, aggregating and analyzing metadata to evaluate events and define a risk to the organization, and applying rules to address the defined risk, initiate responses to organizational users, and initiate instructions to communicate event relays. Event and system management may be performed by one or more of the system manager 160, the rules engine 170, and the message manager 180, and the specific functions performed within the event and system management aspect are further performed within the plurality of algorithms described herein.

Event relay services include notifying people or systems of events and instructions for responsive actions to those events. This aspect of the risk assessment and mitigation platform 140 may also assign responsibility for various follow-on actions, and provide notifications or commands to organizational users via mobile applications. Notifications and commands may also be generated for external systems 196 or affected organizational individuals 195 that are external to the organization 106.

As noted in FIG. 2, the risk assessment and mitigation platform 140 may further include providing one or more user interfaces 200 that enable access to system functions through a management portal. A system user may utilize the management portal, via user interface 200, to configure various aspects of system functionality, such as monitoring or tracking events, people, and reports, configuring, viewing, or adjusting related maps that illustrate events or organizational facilities, and. configuring and tracking survey broadcasts and task assignments.

The management portal and user interfaces may be provided as part of a user support tool that allows users to configure this functionality within the risk assessment and mitigation platform 140 and risk management service 100, and settings for the performance of this functionality. This may be done using a display on a graphical user interface, and/or via web-based or application-based modules. Tools and pull-down menus on such a display (or in web-based or application-based modules) may also be provided to customize these functionalities and monitor performance within the risk assessment and mitigation platform 140 and risk management service 100. Users may access the support tool, management portal, and user interface 200 using desktop, laptop, mobile, and mainframe computing systems, as well as applications resident on such systems, and on mobile telephony, tablet, or wearable computing devices.

Outbound information that is both internal and external to the organization 106 is conveyed within trusted messages 196. Outbound information is communicated via event relays 193 in mobile messages 196 that are generated by the message manager 180, the private mobile messaging system 136, or both, and are sent to mobile clients 137 on their mobile devices 139 using mobile applications 138, and associated with registered organizational individuals 196. These may include notifications, commands, alerts, task or responder assignments, surveys of mobile devices, or actionable forms that users can engage with to response to messages, acknowledge receipt, or comply with policies or procedures. Outbound information may also sent in event relays 196 communicated directly to organizational facilities, or systems controlling facilities, for example lockdown or open commands, such as where doors are capable of being remotely opened and closed by control systems in an Internet-of-Things (IoT) environment without human involvement. In such an example, the risk management and assessment platform 140 may generate an event relay to facilities comprised of an instruction to open or close particular doors automatically in response to a particular threat, or lock down some or all of an organizational facility.

Events relays 193 of outbound information may also be sent to external systems 196 or external individuals 195 via messages 194. This may also include facilities management information, for example where facilities are outside the control of the organization itself. This may include activating nearest cameras or video equipment, initiating a facility lockdown, initiating a marquee strobe to broadcast a message, initiating and facilitating two-way radio communications, providing a public address, and sending emails, texts, or other messages, through either Internet-based or mobile network-based platforms.

Figure 4:
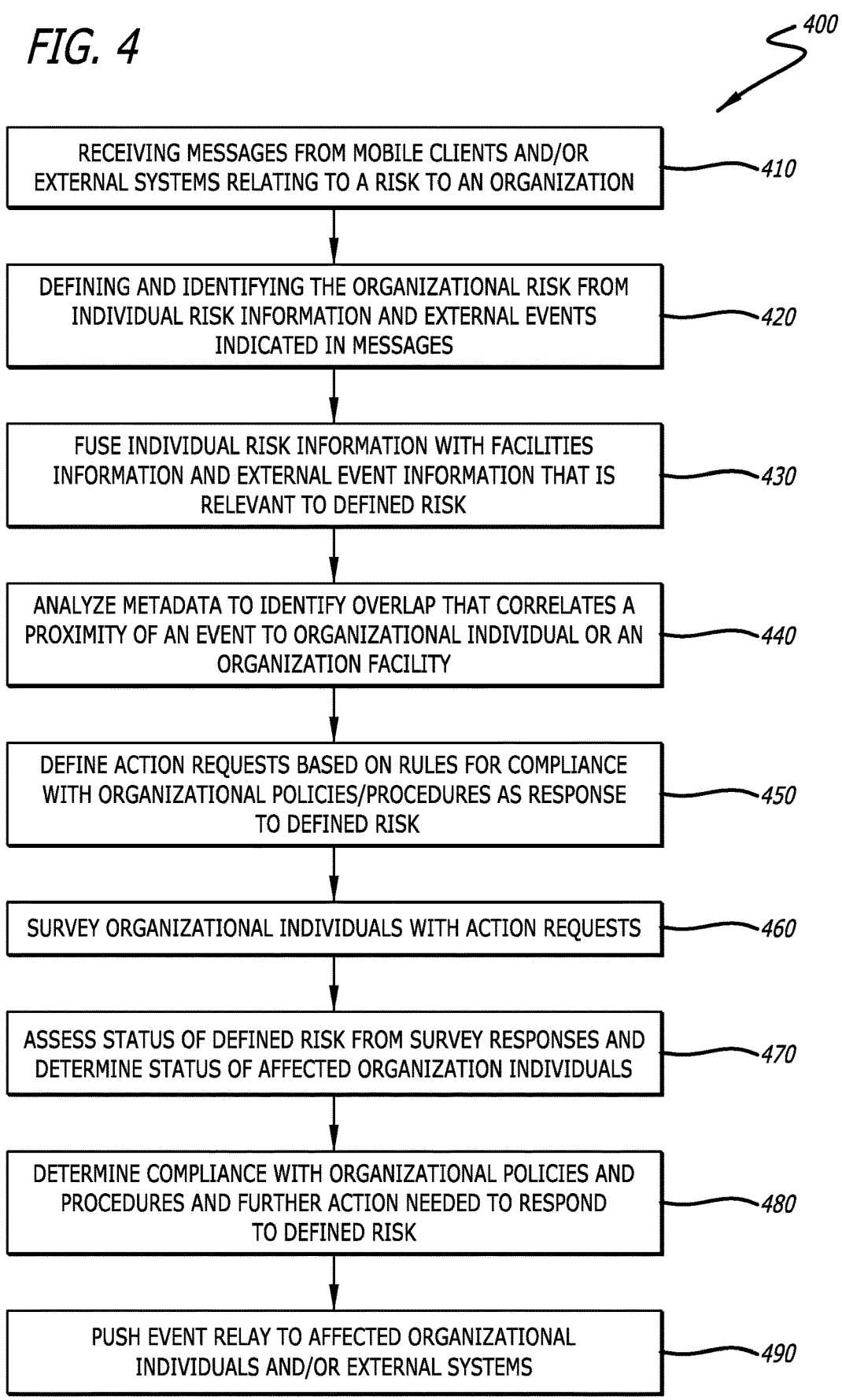
FIG. 4 is a flowchart of steps in a process of performing a risk assessment and mitigation platform in the risk management service according to the present invention.

FIG. 4 is a flowchart illustrating a process 400 for performing the risk management service 100 of the present invention. The process 400 begins at step 410 by receiving input data 110 in mobile messages 103, for example from mobile clients 137 associated with organizational users 102, and external messages 104 from external systems 105, relating to a risk or potential risk to an organization 106. At step 420, the process 400 identifies and defines the risk 162 faced by the organization 106, by analyzing individual risk and action information 111, external event information 120, and facilities information 128 transmitted in the mobile messages 103, external messages 104, and in any other format for conveying relevant information.

This is accomplished by performing one or more algorithms on the input data 110, by applying mathematical models, processes, formulas or functions to analyze the information contained therein as discussed above. At steps 430, the one or more algorithms performed in the process 400 fuse the individual risk and action information 111, external event information 120, and facilities information 128, and at step 440 message metadata 164 is extracted and analyzed to identify overlap in the information therein, and to discern additional event-related information. For example, metadata 164 is analyzed to correlate a proximity of a reported event to one or more of an organizational user 102 or an organizational facility. Many types of analytics of such metadata 164 are possible, as noted above, and are within the scope of the present invention. Additionally, many types of mathematical processing may be performed on such metadata 164 to discern the information needed to satisfy the particular objectives for which the risk management service 100 has been implemented by each organization, and are also within the scope of the present invention.

As noted above, messages within the risk management service 100 include specific metadata 164, which is information that not directly supplied by organizational users 102, external systems 105, or facilities; instead, this information is further descriptive of the input data 110. This metadata 164 may include globally-unique identifiers for each message, and identify the source, type, time, date, and related messages, location, status, and any other descriptive information or characteristics that can aid in subsequent mathematical analyses and processes applied to the input data 110 to define risk 162 and perform the various objectives of the risk management service 100.

At step 450, the process 400 applies one or more rules 172 to processed metadata 164 to both identify affected organizational users 102 and affected organizational facilities, and formulate action requests 182 based on defined protocols for compliance with organizational policies and procedures. These action requests 182 represent an organizational response 186 to the defined risk 162 faced by the organization 106, and may be translated in a number of different wants to ensure that a duty of care is realized and ensure compliance and mitigation of such risk 162. For example, action requests 182 may be applied as a broadcast survey 184 as noted in step 460 to affected organizational users 102, and the risk assessment and mitigation platform 140 may invoke the private mobile messaging system 136 for carrying out the broadcast survey 182 by communicating messages to affected organizational users 102, and any affected external individuals as well.

At step 470, the process 400 assesses a state of the defined risk 162 based on responses 186 received to the action requests 182. This subsequent information is used to determine the status of the affected organizational users 102 and affected organizational facilities. Such responses 186 may be communicated to the risk assessment and mitigation platform 140 via the private mobile messaging system 136 and/or the message manager 180 and/or via the outbound APIs 156, and this may again involve an analysis of metadata 164. At step 480, the process 400 determines the compliance with organizational policies and procedures based on analytics applied to the responses 186 to action requests 182, and determines any further action needed to respond to and address the defined risk 162 faced by the organization 106. At step 490, the process 400 either takes further action, or pushes one or more event relays 193 to the affected organizational users 195 and/or external systems 196 to provide further communications such as notifications, alerts, commands, surveys, task assignments, actionable forms, and any other information needed to meet the particular organizational objectives for implementing the risk management service 100.

The risk assessment and mitigation platform 140 may include, as noted above, a private mobile messaging system (PMMS) 136 that acts as a trusted messaging service, for example between system clients 135 and the system manager 160 for trusted mobile messages 103. Trusted mobile messages 103 are private messages between the system manager 160 of the risk assessment and mitigation platform 140, and some or all of its registered system clients 135, which manage one or more mobile clients 137. These private messages are not preserved on the mobile devices 139 of users 102, and cannot be forwarded or transferred from the mobile devices 139 to any recipient other than the system manager 160. The association between registered mobile devices 139 and the organization's personnel is typically provided by the operating system of the mobile devices 139, but may be supplemented by use of a personal identification number (PIN) known only by the individual associated with the mobile device 139 in the registration process. Trusted mobile messages 103 are also secure, as all messaging in the PMMS 136 is encrypted.

Trusted mobile messages 103 are also authentic. This is because all messages from system clients 135 are originated by responsible a system manager(s) 160 of the organization, while all message content provided externally is controlled by the relevant inbound API 152 for such external systems 105, such that origination of those messages is controlled by those APIs 152 only. Trusted external messages 104 are further curated by responsible system managers 160 before incorporation into the service's messaging. Further, all message content from system clients 135 only comes from those personal mobile devices 139 that have been registered with the risk management service 100.

All information within the PMMS 136 is preserved in the secure, cloud-based database 154, with access limited to the organization's system manager(s) 160. This permits the organization 106 to certify its adherence to policies and procedures to preserve the privacy and security of the information contained in the trusted messages 103 and 104. System managers 160 are only permitted to analyze, summarize, or distribute data products derived from this information as permitted by the organization's policies and procedures. No system clients 135 have access to this information except as provided by the system manager 160.

Examples of a private mobile messaging system may be further found in U.S. Pat. Nos. 8,812,607 and 9,705,841.

The risk management service 100 also provides, in another embodiment of the present invention, an audit trail and risk/litigation mitigation function to help organizations 106 comply with policies and procedures, and legal and regulatory requirements, in a timely and comprehensive manner. As noted above, the audit manager 210 may be configured to maintain an audit trail and carry out mitigation functions, for example to ensure compliance with legal and regulatory requirements as early as possible.

Auditing and mitigation functions in the risk management service 100 of the present invention leverage the private, managed network aspect that connects the organization's employees, and may include a dashboard, for example configured with the user interface 200, that tracks and stores all organizational actions and displays them to relevant system users and affected organizational users 102. Using such a dashboard, a manager tasked with responsibility for auditing, compliance and mitigation may, when faced with a litigation sensitive event (e.g., an injury, a dismissal, a retaliation claim), enter that event into the risk assessment and mitigation platform 140. The rules engine 170 may then be applied to examine the type of event that was entered and the organizational user that made the entry, and apply one or more rules 172 to determine who should be informed of the event and who has access to the information. The manager's responsive actions may be tracked and displayed via the dashboard, which may have controlled access to minimize the possibility of tampering or data corruption.

Through functions such as auditing and mitigation, and generally due to the cloud-based structure that monitors registered organizational users 102 network-wide within an organization 106, the risk management service 100 maintains management control of every important event that occurs within its purview, and which represents a defined risk 162 faced by the organization 106. Auditing and mitigation further ensures that all action requests 182, surveys, 184, and responses 186 to such requests 182 or surveys 184 or both, and other event relays 193, re timely, and that there is an audit trail maintained for all actions taken. Aspects such as the dashboard may allow an event to be kept open until all the required responses are completed and the one or more rules governing responses to defined risks 162 have been satisfied. Even after an event is closed, the present invention may maintain and store an audit trail of the organization's actions and outcomes thereof for future uses.

Auditing and mitigation functions may further enable particular service features, such as for example a special employee network that is designed to empower registered organizational users 102 to report important complaints such as discrimination, harassment and/or retaliation complaints. In such an embodiment, the special employee network is designed to ensure privacy and protect users' personally identifiable information. In such a scenario, the organization 106 may designate someone internal (or a neutral third party outside the organization) as a compliance officer, who's task is to investigate any employee complaints. Each employee within such a network may have a private connection to that compliance officer, and any employee complaint goes only to the designated compliance officer. This private connection to the organization 106 can also be used by employees to report any organizational activities that the employee believes to be illegal, unethical, or not correct. This enables the organization 106 to address any whistleblower inputs as quickly as possible.

Other particular service features within the auditing and mitigation functions may include discrimination and harassment minimization, to protect both employees and customers, employment law issues such as wage law violations, immigration audits, breach of contract situations, intellectual property violations, equal opportunity violation allegations, and unsafe workplace allegations. The auditing and mitigation functions may also be applied in many other possible use case scenarios.

Organizations 106 may also implement specific risk mitigation systems and integrate such systems, externally controlled or otherwise, within the risk management service 100. Common risk mitigation systems include electronic security systems, video surveillance systems, data network security systems, and any other special-purpose systems to meet unique organizational needs.

Electronic security systems are systems primarily focused on ensuring the security and safety of organizational assets when those assets are present within the organization's facilities. These systems include, for example, access control, intrusion detection, and fire detection. Such systems are typically connected to local and, in some cases, wide-area networks that are often dedicated to security functions. They often depend upon dedicated monitoring, either by the organization 106 itself, or by third-party services and may also include additional, internal functionality such as significant reporting capabilities that can provide forensic utility.

Video surveillance systems provide substantial forensic utility and, particularly when coupled with real-time image analysis, significant support for human asset safety and security. Widespread availability of camera and video systems, and the wide availability of IP connectivity for these devices, means that such systems can be implemented with sufficient density to provide a high degree of coverage for an organization's facilities.

Data security is another area of significant risk for organizations 106. Network security is provided in the risk management service 100 in a mature set of network monitoring, network intrusion detection, and network traffic analysis systems. Because the timelines associated with network security threats are so short, these systems provide extensive real-time analysis, monitoring, and mitigation capabilities.

In the risk assessment and mitigation platform 140, one or more of the system manager 160, the rules engine 170, and the message manager 180 may include or access a machine learning modeling layer that is comprised of one or more neural networks that further evaluate the input data 110 to increase accuracy in the algorithms therein. These one or more neural networks are tuned to adjust the aggregation and integration of input data 110 and analysis thereof to define a specific risk faced by the organization, determine how to address the defined risk 162, and improve the overall performance of the risk management service 100. The present invention therefore contemplates that one or more techniques of artificial intelligence may be applied to the data processing and mathematical functions described herein.

There are many types of neural networks, which are computing systems that "learn" to perform tasks without being programmed with task-specific rules, based on examples. Neural networks generally are based on arrays of connected, aggregated nodes (or, "neurons") which are computational units that transmit signals to each other in multiple layers over connections. Connections are activation or transfer functions that "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e. decay) over time, as a system learns what weights should be, and how they should be adjusted. In other words, neural networks evolve as they learn, and the mathematical formulas and functions that comprise neural networks design can change over time as a system improves itself.

A machine learning modeling layer comprised of one or more neural networks may be applied in the risk assessment and mitigation platform 140 by analyzing the overlap in the metadata 164 between the individual risk and action information 111 and the external event information 120 to calculate weights and biases for the mathematical functions used to process inputs and assign values to each node thereof. The weights and biases may also assigned within the various layers (or, nodes and connections) of the one or more neural networks, and adjusted as individual risk and action information 111 for each organizational user 102 is processed, and as further information (such as facilities information 128) is identified. Many examples of such an application are possible. For example, where messages 103 or 104 are sent with common language that indicates classification as raising a particular issues, the machine learning modeling layer may be applied to model potential responses to survey broadcasts 184 based on simulated or predicted movement or responses of the affected organizational users 102 or predicted status of organizational facilities. Those potential responses may then be compared with actual responses 186, for example movement of affected organizational users 102 based on geo-location signals transmitted by their associated mobile devices 139, and further actions can be decided upon accordingly.

The systems and methods of the present invention may be implemented in many different computing environments 130. For example, the risk assessment and mitigation platform 140 may be implemented in conjunction with a special purpose computer, a programmed microprocessor or microcontroller and peripheral integrated. circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA.RTM or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the present invention may apply additional machine learning techniques, and/or other models, to evaluate input data 110 and metadata 164. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:

receiving input data that at least includes at least one of individual risk information in messages generated by one or more mobile clients, the one or more mobile clients associated with registered organizational users, and external event information in messages generated by one or more external systems;

analyzing the input data in a plurality of data processing modules within a computing environment in which the plurality of data processing modules are executed in conjunction with at least one processor operable to execute program instructions stored within at least one computer-readable non-transitory storage medium, the plurality of data processing modules configured to assess and mitigate a defined risk for an organization, by integrating the individual risk information for all of the registered organizational users that is relevant to the defined risk, with facilities information representing at least one organizational facility for the organization that is relevant to the defined risk, and with the external event information relevant to the defined risk, by analyzing metadata from the at least one of the individual risk information and the external event information to identify a metadata overlap between the individual risk information and the external event information that correlate a proximity of an event to one or both of a registered organizational user or an organization facility, the proximity defined by one or more of a globally-unique message identifier, a message source, a message type, a timing of message origination, an associated message identifier, a location of an originating device, and a status of the originating device, analyzing integrated individual risk information and external event information from the metadata overlap to define one or more action requests representing risk-reduction actions that are determined from correlations between the proximity of the event to one or both of a registered organizational user or an organization facility derived from the metadata overlap, based on rules that represent compliance with defined policies and procedures of the organization as a response to the defined risk, configuring at least one message having the one or more action requests representing the risk-reduction actions, and pushing the at least one message having the one or more action requests representing the risk-reduction actions to the registered organizational users through the one or more mobile clients to obtain further message metadata and survey information representing affected organizational users or an affected organizational facility in response to the one or more action requests representing the risk-reduction actions, wherein the one or more mobile clients confirm both receipt of the one or more action requests and an acknowledgment with the rules by the registered organizational users, aggregating information obtained from responses to the one or more action requests representing the risk-reduction actions from the one or more mobile clients to assess a status of the defined risk, and determining a further status of affected organizational users from the responses, to identify the compliance with the organizational policies and procedures and further action to address the defined risk, determining a risk assessment from the status of the defined risk, and the further status of the affected organizational users, and identifying a geo-location of the affected organizational users, and associating the geo-location of the affected organizational users, with external access control relative to the proximity of the event for the affected organizational facility based on the risk assessment; and actuating external access control for the affected organizational facility based on the geo-location of the affected organizational users, by activating one or more of a camera or a door that grants and limits access relative to the affected organizational facility, to address the defined risk.

2. The method of claim 1, further comprising communicating an event relay to at least one of the one or more mobile clients and the one or more external systems, the communicating the event relay further comprising one or more of pushing a notification to the one or more mobile clients, assigning a task to the one or more mobile clients, sending a message to the one or more mobile clients or the one or more external systems, sending a command to the one or more external systems, and sending a notification to the one or more external systems.

3. The method of claim 1, further comprising generating one or more of mitigation assessment relative to the defined risk, and a report of compliance with organizational policies and procedures by the affected organizational users.

4. The method of claim 1, further comprising generating a display of an outbound alert representing the event relay, the affected organizational users who have acknowledged the outbound alert, and the affected organizational users who have not acknowledged the outbound alert.

5. The method of claim 1, further comprising identifying the defined risk from one or both of the messages generated by one or more mobile clients and the messages generated by one or more external systems.

6. The method of claim 5, wherein the analyzing metadata further includes comparing the messages generated by one or more mobile clients with the messages generated by one or more external systems to identify the registered organizational users and the organizational facilities that are affected by the defined risk.

7. The method of claim 1, wherein the individual risk information represents one or more actions that are either taken or requested by the at least one registered organizational user, the one or more actions including a report, a request for support, a monitor signal, a panic signal, a survey broadcast, or an access request.

8. The method of claim 1, wherein the individual risk information is generated within a private mobile messaging system configured with at least one system client that communicates with a mobile application associated with a mobile device of the least one registered organizational user.

9. The method of claim 8, wherein the analyzing the input data further comprises facilitating communications between the one or more mobile clients and the system manager, the external systems and the system manager, and the message manager and the external systems within a plurality of application programming interfaces, the plurality of application programming interfaces including:

a set of inbound information application programming interfaces for exchanging information between the organization and the one or more mobile clients, a set of inbound application programming interfaces for exchanging information between the organization and the external systems, a set of outbound information application programming interfaces for relaying the one or more action requests to the one or more mobile clients, and a set of outbound application programming interfaces for relaying information to external systems to implement specific actions associated with the defined risk.

10. The method of claim 1, further comprising requesting the facilities information representing the at least one organizational facility for the organization from a secure organizational database via a system client configured to manage information relevant to the organization.

11. An organizational risk management system comprising:

one or more inbound application programming interfaces configured to manage ingest of input data that includes at least one of individual risk information generated by one or more mobile clients associated with registered organizational users, and external event information generated by one or more external systems;

a system manager configured to identify a defined risk to the organization from the input data, and integrate individual risk information for all of the registered organizational users that is relevant to the defined risk, with facilities information representing at least one organizational facility for the organization that is relevant to the defined risk, and with the external event information relevant to the defined risk, by analyzing metadata from the at least one of the individual risk information and the external event information to identify a metadata overlap between the individual risk information and the external event information that correlates a proximity of an event to one or both of a registered organizational individual or an organizational facility, the proximity defined by one or more of a globally-unique message identifier, a message source, a message type, a timing of message origination, an associated message identifier, a location of an originating device, and a status of the originating device;

a rules engine configured to define and apply rules that represent compliance with defined policies and procedures of the organization as a response to the defined risk, and analyze integrated individual risk information and external event information from the metadata overlap to define one or more action requests representing risk-reduction actions that are determined from correlations between the proximity of the event to one or both of a registered organizational user or an organization facility derived from the metadata overlap based on the rules; and a message manager configured to generate at least one message having the one or more action requests representing the risk-reduction actions, and push the at least one message having the one or more action requests representing the risk-reduction actions to the registered organizational users through the one or more mobile clients to obtain further message metadata and survey information representing affected organizational users or an affected organizational facility in response to the one or more action requests representing the risk-reduction actions, wherein the one or more mobile clients confirm both receipt of the one or more action requests and an acknowledgment with the rules by the registered organizational users, wherein the system manager aggregates information obtained from responses to the one or more action requests representing the risk-reduction actions from the one or more mobile clients to assess a status of the defined risk, and determines a further status of affected organizational users from the responses, to identify the compliance with the organizational policies and procedures and further action to address the defined risk, determine a risk assessment from the status of the defined risk, and the further status of the affected organizational users, and identify a geo-location of the affected organizational users, and associate the geo-location of the affected organizational users with external access control relative to the proximity of the event for the affected organizational facility based on the risk assessment, and wherein the system manager actuates external access control based on the geo-location of the affected organizational users by activating one or more of a camera, or a door that grants and limits access relative to the affected organizational facility to address the defined risk.

12. The system of claim 11, wherein the system manager generates an event relay that represents an outbound alert, and wherein the event relay is one or more of a notification pushed to the one or more mobile clients, a task assigned to the one or more mobile clients, a message sent to the one or more mobile clients or the one or more external systems, a command sent to the one or more external systems, and a notification sent to the one or more external systems.

13. The system of claim 11, wherein the system manager generates at least one of a mitigation assessment relative to the defined risk, and a report of compliance with organizational policies and procedures by the affected organizational users.

14. The system of claim 11, wherein the system manager generates a display of an outbound alert representing the event relay, the affected organizational users who have acknowledged the outbound alert, and the affected organizational users who have not acknowledged the outbound alert.

15. The system of claim 11, wherein the defined risk is identified from one or both of messages generated by the one or more mobile clients and messages generated by the one or more external systems.

16. The system of claim 15, wherein the system manager analyzes metadata by comparing the messages generated by the one or more mobile clients with the messages generated by the one or more external systems to identify the organizational users and the organizational facilities that are affected by the defined risk.

17. The system of claim 11, wherein the individual risk information represents one or more actions that are either taken or requested by the at least one registered organizational user, the one or more actions including a report, a request for support, a monitor signal, a panic signal, a survey broadcast, or an access request.

18. The system of claim 11, wherein the individual risk information is generated within a private mobile messaging system configured with at least one system client that communicates with a mobile application associated with a mobile device of each of the registered organizational users.

19. The system of claim 18, wherein the one or more inbound application programming interfaces include:

a set of inbound information application programming interfaces for exchanging information between the organization and the registered organizational users, and a set of inbound application programming interfaces for exchanging information between the organization and the one or more external systems.

20. The system of claim 19, further comprising one or more outbound application programming interfaces, including a set of outbound information application programming interfaces for relaying the one or more action requests to the one or more mobile clients, and a set of outbound application programming interfaces for relaying information to one or more external systems to implement specific actions associated with the defined risk.

21. The system of claim 11, wherein the facilities information representing the at least one organizational facility for the organization is stored in, and retrieved from, a secure organizational database via a system client configured to manage information relevant to the organization.

* * * * *